969,458. CHEWING-GUM. ORLANDO J. BUCK, Chicago, Ill. Filed Oct. 19, 1908, Serial No. 458,369. Renewed July 22, 1910. Serial No. 573,286.

*To all whom it may concern:*

Be it known that I, ORLANDO J. BUCK, a citizen of the United States, residing at Chicago, in the county of Cook and State of Illinois, have invented or discovered certain new and useful Improvements in Chewing-Gum, of which the following is a specification.

This invention or discovery relates to a new and improved chewing gum and it has for its object to produce at low cost a new composition which is at once pure, wholesome and palatable, and possesses in a high degree those peculiar characteristics which go to make up a choice confection of the character referred to.

It is a matter of common knowledge that chicle gum is admirably suited for, and is generally used as, the basis of most chewing gums on the market and it is also well known that this gum is, relatively speaking, very expensive, so that other gums and ingredients are mixed therewith to reduce the cost. In other words, the chicle gum possesses in a marked degree the necessary permanence of characteristics under chewing, neutrality of taste and odor and elasticity which are desired, but in order to save cost, is used only in such proportions as will impart to the other ingredients compounded therewith its own, or approximately its own, desirable characteristics.

I have discovered a new composition which in neutrality of taste and odor, elasticity and lasting qualities, is markedly similar to the commercial chewing gums which contain chicle as a chief character-giving ingredient and which composition is at the same time perfectly pure and wholesome.

My invention resides in the discovery that asphalt can be used as the base or chief ingredient of a composition characterized as above set forth. I refer to the true asphalt produced by nature.

Asphalt in its natural condition is not at all suitable for chewing, being, when hard enough to be chewed at all, very friable and crumbly when first placed in the mouth and non-elastic, hard and generally unsatisfactory as a chewing gum, after it has been thoroughly chewed up and warmed in the mouth. Moreover the asphalt most commonly known has a lasting pungent taste and odor which is disagreeable or intolerable to most persons. I have discovered, however, that the Mexican asphalt which is produced in the State of Mexico, and perhaps elsewhere, can be so tempered and changed by adding suitable other ingredients thereto as to radically change its physical characteristics and produce the improved chewing gum of the present invention. I produce such a composition by combining with the asphalt a tempering gum which imparts thereto mastic qualities (i. e. stickiness and capacity to be drawn into attenuated strings) together with an actual or apparent degree of elasticity so that when chewed, it produces a sensation of elasticity between the teeth and is not readily bitten into pieces. I also add a permanent softener, consisting of some oleaginous material, and to render the gum both palatable and non-sticky until chewed, I add sugar. Ordinarily I also add any suitable flavoring, which latter performs the usual function of rendering the gum more or less permanently palatable.

A preferred formula is as follows, the proportions being by weight: neutral asphalt (i. e. asphalt which is substantially devoid of taste and odor under normal conditions 30%, Porto Rican gum (gum chuca) 10%; sugar 56%, caramel paste (a pasty composition of oleo or butter fat and sweet milk or cream) 4%, flavoring extract to suit. Gum chuca is a preparation composed of 68% resin, 29% gum and 3% moisture. The preparation is known to the market under the above name. The other ingredients are well known and do not need further description. These ingredients, with the exception of the flavoring, are reduced to liquid condition by gentle heating and then thoroughly mixed by stirring in any suitable manner. After the compound has been sufficiently mixed, and cooled to a temperature below that at which the flavoring (if it be an essential or a volatile oil) would be volatilized, the flavoring is added and thoroughly mixed in. The subsequent steps of forming the gum into sticks or lozenges is performed as usual.

I claim as my invention:

1. As a new article of manufacture, chewing gum comprising as ingredients, neutral asphalt, a tempering gum and oleaginous softener, in suitable proportions.

2. As a new article of manufacture, chewing gum comprising as ingredients, neutral asphalt, a tempering agent having mastic qualities, oleaginous softener and sugar, in suitable proportions.

3. As a new article of manufacture, chewing gum comprising as ingredients neutral asphalt, gum chuca, oil and sugar.

4. As a new article of manufacture, chewing gum comprising as ingredients, neutral asphalt, gum chuca, animal fat, lacteal fluid and sugar.

5. As a new article of manufacture, chewing gum comprising as ingredients, natural, substantially tasteless and odorless asphalt, tempering gum having mastic qualities, oleaginous softener, sugar and flavoring in suitable proportions.

ORLANDO J. BUCK.

Witnesses:
LOIS FORCE,
F. L. BELKNAP.